United States Patent [19]
Oeftering

[11] Patent Number: 6,029,518
[45] Date of Patent: Feb. 29, 2000

[54] MANIPULATION OF LIQUIDS USING PHASED ARRAY GENERATION OF ACOUSTIC RADIATION PRESSURE

[75] Inventor: Richard C. Oeftering, Amherst, Ohio

[73] Assignee: The United States of America as represented by the Administrator of the National Aeronautics and Space Administration, Washington, D.C.

[21] Appl. No.: 08/969,537

[22] Filed: Sep. 17, 1997

[51] Int. Cl.$^7$ .................................................. B01D 17/06
[52] U.S. Cl. ........................... 73/570.5; 210/748; 55/277
[58] Field of Search .................................. 73/570.5, 570, 73/432.1; 210/748, 738, 188; 209/155; 406/198; 367/137, 138, 191; 55/15, 277

[56] References Cited

U.S. PATENT DOCUMENTS

| | | | |
|---|---|---|---|
| 4,284,403 | 8/1981 | Rey | 432/1 |
| 4,425,376 | 1/1984 | Lee | 427/57 |
| 4,877,516 | 10/1989 | Schram | 210/748 |
| 4,983,189 | 1/1991 | Peterson et al. | 210/748 |
| 5,006,266 | 4/1991 | Schram | 210/748 |
| 5,225,089 | 7/1993 | Benes et al. | 210/748 |
| 5,485,843 | 1/1996 | Greenstein et al. | 128/661.09 |
| 5,509,417 | 4/1996 | Dias et al. | 128/662.06 |
| 5,520,715 | 5/1996 | Oeftering | 73/335 |
| 5,521,883 | 5/1996 | Fage et al. | 367/90 |
| 5,831,166 | 11/1998 | Kozuka et al. | 73/570 |

OTHER PUBLICATIONS

NASA LeRC Technology Open House Handout "Fluid Manipulation by Acoustic Radiation Pressure or Using Sound to Push Water Around" by Richard Oeftering, Sep. 19, 1996.

NASA LeRC Technology Opportunity Paper . . . Combustion & Fluids CF–070–1 . . . "Technology Opportunity " Liquid Manipulation by Acoustic Radiation Pressure by Richard Oeftering, Sep. 19, 1996.

*Primary Examiner*—Hezron Williams
*Assistant Examiner*—Rose M. Miller
*Attorney, Agent, or Firm*—Kent N. Stone

[57] ABSTRACT

A phased array of piezoelectric transducers is used to control and manipulate contained as well as uncontained fluids in space and earth applications. The transducers in the phased array are individually activated while being commonly controlled to produce acoustic radiation pressure and acoustic streaming. The phased array is activated to produce a single pulse, a pulse burst or a continuous pulse to agitate, segregate or manipulate liquids and gases. The phased array generated acoustic radiation pressure is also useful in manipulating a drop, a bubble or other object immersed in a liquid. The transducers can be arranged in any number of layouts including linear single or multi-dimensional, space curved and annular arrays. The individual transducers in the array are activated by a controller, preferably driven by a computer.

13 Claims, 7 Drawing Sheets

MANIPULATION OF LIQUIDS USING PHASED ARRAY GENERATION OF ACOUSTIC RADIATION PRESSURE

ORIGIN OF THE INVENTION

The invention described herein was made by an employee of the United States Government and may be manufactured and used by or for the government for government purposes without payment of any royalties thereon or therefore.

SUMMARY OF THE INVENTION

This invention relates to the control and manipulation of contained and uncontained liquids in outer space applications and on earth. More specifically, the invention relates to non-invasive agitation, segregation, and free surface manipulation of liquids and gases, and objects immersed in liquids. The manipulation is achieved using acoustic high intensity acoustics as acoustic radiation pressure and/or acoustic streaming generated by one or more arrays of transducers which are separately activated but commonly controlled.

BACKGROUND OF THE INVENTION

The use of mechanical or manual, oscillating or rotating devices to agitate and mix liquids has been known for centuries. The majority of these prior art methods involve mechanical devices or systems that intrude into the liquid volume or mass. Agitation of a liquid is usually achieved by a mechanical propeller or similar rotating or oscillating device that induces a flow which in turn causes mixing. Another approach for mixing is to continuously pump the liquid into an external system which introduces other materials into the liquid. The action of the pump and the natural turbulence of the flow through pipes and orifices agitates the liquid.

These oscillating and propelling devices require mechanical hardware which intrude into the liquid mass. In externally pumped systems, the propelling hardware operates outside the main volume but requires external plumbing to convey the liquid to and from the agitation. Furthermore, the mechanical device is usually driven by a motor which require the use of bearings and seals. The seals wear and often leak, and the bearings need lubrication creating a need for monitoring and servicing over long periods. For space applications, the agitation systems are frequently inaccessible and unserviceable, particularly on unmanned flights.

In industrial systems, the use of mechanical devices with their attendant bearings and seals are subject to attack, particularly if the liquid contains abrasives or is chemically aggressive. Furthermore, the mechanical approach often introduces contaminants into the liquid from leaking seals, bearing lubricants, and particle contamination due to wear. The same mechanical parts usually complicate the cleaning of fluid systems between uses.

The presence of unwanted bubbles and solids in liquid masses often creates a problem of removal, typically accomplished by using mechanical filters or centrifuging to remove these unwanted objects from the liquid. Other methods including gravity or buoyancy are often used to separate the solids and bubbles from the liquid. A settling tank is an example where the flow of the liquid is temporally halted so that relatively dense objects will migrate toward the bottom, while relatively light objects such as bubbles will gravitate to the top of the liquid.

Yet another approach employs the use of electric or magnetic fields to act on charged particles to cause their separation from the liquid.

These various prior art separation systems all have certain drawbacks. For example the mechanical filters used to trap particles and bubbles, requires movement of the liquid through the filter. To filter the entire volume of liquid, the entire volume must pass through the filter. Filtering of a small mass of liquid requires that the liquid be transported from one container to another by pouring or by pumping the liquid through the filter.

In space, gravity cannot be relied upon to separate particles or bubbles from a fluid. In earth applications, gravity has little influence on objects that have a density close to that of the liquid. Buoyancy likewise is not effective for separation when turbulent flow acts to keep objects and bubbles suspended in liquid. Centrifugal segregation can be used in space but its effects cease when rotation stops. Furthermore, the centrifugal rotation of complex and sometimes large liquid volumes, and the associated machinery needed for centrifugal rotation creates added complexity for the space driven application.

The deployment of drops and gas or gas bubbles in liquid typically require the use of a needle to control placement of the drop or gas bubble. The drop or bubble is deployed at very low velocity to prevent splatter or dispensing of excess material. A volumetric pump or a pressure driven displacement mechanism is used to form the drop. Gravity or inertia is used to separate the drop; alternatively, the drop is dispensed by direct wetting against a target surface.

In space applications, matched needles are often used to form a drop between them. Retraction of the needles at high speed causes the drop to be left in a stationary position within the gas or the liquid media. However, the use of needles for deployment of drops and bubbles in space is very restricted. In space, the inertia of the drop is used to overcome surface tension when the matched needles are retracted. The need to overcome surface tension is a property of the material that is not easily controlled, and thus limits the useful application of this form of dispensing.

On earth, the gravity is a force that controls the drop size and deployment. The drop deployment occurs when the drop grows until its weight exceeds the surface tension. Again, the deployment relying upon the weight of the drop, is not easily controlled, thereby limiting the use of this method for dispensing drops and bubbles.

Free surface manipulation such as the formation of standing waves for coatings or for mass solder operations such as "wave soldering", usually rely on a liquid jet. A stream of liquid is propelled from the bottom of a free surface pool. The stream is directed at the surface and creates a small fountain which appears as a standing wave.

The mechanical method of manipulating free liquid surfaces share problems with mechanical agitation. Here again, the presence of seals, bearings and their intrusive nature creates serviceability and maintenance problems and limits their effectiveness. The inability to sense the position of the surface and to respond to changes is a further limitation that prevents the widespread use of mechanical means for surface manipulation.

Manipulation or the act of controlling the position of an object in a liquid is usually done with intrusive mechanical means. Probes and needles are used to propel objects and control their placement. Liquid jets from nozzles can also be used for this purpose.

As with the prior art drawbacks with agitation, the intrusive mechanical manipulation of immersed objects likewise has the ongoing problem with seals, bearings, mechanical linkage, leakage and wear servicing. Furthermore, the limited mobility of mechanical devices restricts the ability to manipulate objects that may move outside the working range of the mechanical device. Mechanical devices lack the ability to sense and to provide feedback to control the manipulation without a great deal of hands on intervention.

Common spraying techniques produce large numbers of droplets. Where the droplets are required to be uniform in size, ink jet printing is a common method of achieving this objective. In some embodiments, a steady stream of droplets are emitted from the orifice, and capillary waves are induced by external vibration or pressure perturbation. In another embodiments, a small volume of liquid is contained in a reservoir equipped with an orifice or nozzle that is juxtaposed to a pressure pulse source. The pressure source emits a mechanically or thermally induced pressure wave that causes a high pressure transient at the orifice which thereby ejects a small volume of liquid as a drop.

These spraying processes produce a wide distribution of droplets at high velocity and over a wide pattern. In order to be used to apply coatings, paints and adhesives to specific areas on a surface, it is necessary to mask or shield all the areas that are not intended to receive the liquid. This causes the liquid that falls on the masked area to be lost, thereby incurring waste in terms of liquid and masking material.

Jetting techniques such as those used for ink jet printers, operate without masks but have a very small orifice or nozzle diameter, usually smaller than the drops which are produced. The smaller orifice is easily clogged by solid particles. The continuous ejection mode has a narrow operating range which normally requires an ejection velocity of several meters per second. To produce uniform drops, the process of ejection must keep up with the jet velocity which in turn means that the droplet production rate may be as high as 100,000 drops per second or greater. This high production rate makes it difficult for most existing systems to use all of the drops. The efficiency of some ink jets may be as little as two percent of the drops produced, thereby necessitating collection and recycling of the remaining ninety-eight percent of the drops.

The drop-on-demand drop ejectors produce only the drops needed at a given instant, thereby requiring the pressure of ejection to occur instantaneously. The high pressure transient may be absorbed easily by a gas bubble in the system, therefore bubbles cannot be tolerated in the system. The drop-on-demand system is not practical with high viscosity liquids.

Simple focused acoustic beams in burst mode can achieve droplet ejection in a wider range of operating conditions than the prior art methods and can be adjusted during operation. One limitation with respect to this procedure is the sensitivity to liquid surface position relative to the focal length. The liquid surface must be within a wavelength of the maximum intensity to achieve drop ejection. As a result, the process is sensitive to surface waves and variations in the surface position.

SUMMARY OF THE INVENTION

It is an object of the present invention to provide a non-intrusive tool for manipulating liquids.

Another object of the present invention is to control liquids in zero gravity environments such as those encountered in space.

Yet another object of the present invention is the elimination of moving parts, as well as the wear and leakage attended therewith, in liquid droplet delivery systems.

Still another object of the present invention is the ability to move the direction and the focus of acoustical waves in a body of liquid to manipulate the liquid content.

Still another object of the present invention is the use of acoustic sensing to provide feedback information on the operation of the system.

Yet another advantage is the use of tone burst for the modulation of acoustic waves.

These and other objects are achieved through a process of manipulating the contents of a liquid mass by applying high intensity acoustics, which is defined for purposes of this invention as acoustic radiation pressure and/or acoustical streaming. By high intensity is meant at least several hundred and preferably at least 1000 watts per square centimeter. The process uses at least one acoustic array comprising a plurality of individually driven but commonly controlled acoustic radiation transducers. This high intensity acoustics can be used to manipulate the liquid mass or a body such as a solid, or a gas, within the liquid mass. It can be used for example to control the relationship between a plurality of bodies in liquid mass or can be used to propel a body through the liquid mass. Furthermore, it can be used to remove a body from the liquid mass or to segregate the body within the liquid mass. The array of acoustic radiation transducers can be used to agitate the liquid or to eject a drop from an unconfined surface of the liquid or to cause surface deformation at the free surface of the liquid.

Furthermore, the process can be used to eject a plurality of drops from the liquid in a sequential fashion by acoustic streaming. The high intensity acoustics can be applied to the liquid mass by a single pulse, by a continuous wave or by the use of individual tone bursts of acoustic radiation pressure. The acoustic radiation pressure can be applied to the liquid mass at multiple points in rapid succession by beam hopping.

The acoustical phase array can be used to focus acoustic radiation pressure against an acoustically reflective surface to redirect the wave pressure to a target mass. The process can be used to manipulate an object in a liquid mass or to move one fluid anomaly within another liquid with which it is immiscible. The acoustical radiation pressure is generated through a plurality of arrays of acoustical transducers with a computer controlling the operation of each array.

In another aspect, the invention relates to an apparatus for manipulating the contents of a liquid mass. The apparatus comprises a plurality of acoustical radiation transducers in a phased array, a control means for activating individual transducers in the phased pattern, a means for focusing the transducers on a target, a boundary physically separating the transducers from the liquid mass while acoustically coupling the transducers to the liquid mass.

In the apparatus, the control means includes an electrical connection between each transducer in the phased pattern and an electrical signal. The signal originates in a signal generator circuit which includes a radio frequency power amplifier circuit. This amplifier circuit preferably includes an impedance matching network and an acoustic feedback signal for acoustical sensing.

DETAILED DESCRIPTION OF THE INVENTION

Figure 2:
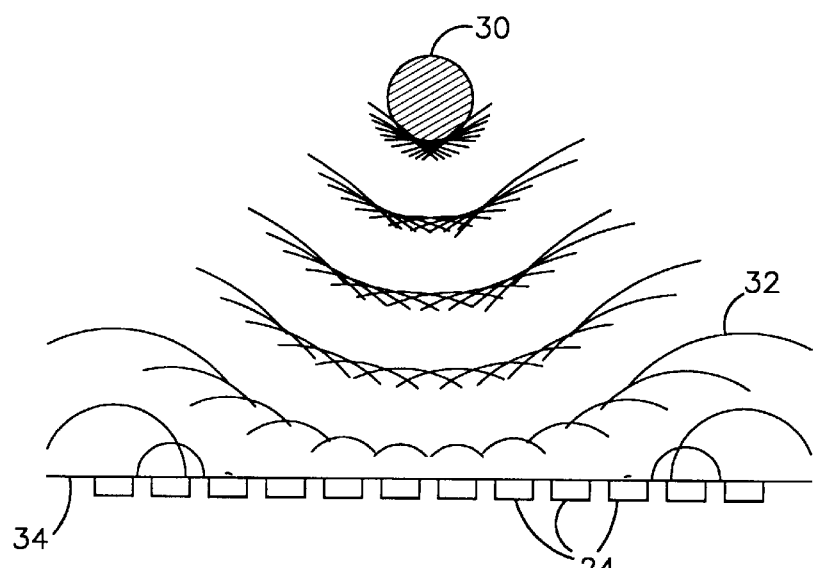
FIG. 2 shows an acoustic radiation pressure phased array wave pattern

The purpose of the present invention is to control or manipulate liquids by using an acoustic phased array that produces high energy acoustic waves thereby creating a force called acoustic radiation pressure and a non-linear effect called acoustic streaming. The acoustic streaming, also known as acoustic wind or quartz wind accompanies the application of high intensity sounds in gases and liquids as is a time independent flow which occurs near immersed obstacles or oscillating bodies. A more detailed discussion of the theories and nature of acoustic streaming are presented in the text entitled "High Intensity Ultra Sonic Fields" edited by L. D. Rosenberg, printed by Plenum Press in 1971. A plurality of acoustic transducer elements are arranged in a linear one dimensional array, a two dimensional array, or an annular array of concentric transducer rings. The individual transducer elements are electrically driven as individual channels. Each channel is under a common controller. The timing of the acoustic wave emission is controlled by delaying or advancing the emission time event based on a set reference point. By adjusting the time shift or phase shift, the elements emit a wave pattern such that construct and destruct interference waves cause a single wave pattern to emerge as seen in FIG. 2. Thus a shifted array can synthesize a wave or wave pattern that can be steered at angles relative to the axis of the array or can be caused to diverge or converge to a predetermined focal point. The convergence of a plurality of acoustic waves on a singular focal point creates a high intensity, thereby generating acoustical radiation pressure and/or non-linear acoustic streaming.

An acoustic transducer array is made up of a plurality of individual transducer elements, each of which operates on an independent power and signal source. The number of elements and the arrangement of the elements will vary dependent upon the particular end use application. The larger the number of transducer elements in the array, the more precise will be it's ability to control and to manipulate the contents of a fluid mass. However, as the number of elements increases, there is a increase in the complexity of the electrical circuitry required to control and drive the individual transducer elements. The transducer elements may be made from a variety of piezoelectric materials. A piezoelectric material is one that is capable of converting electrical energy into acoustic energy. Included among commonly known piezoelectric materials are single crystal materials such as quartz or lithium niobate, polycrystalline ceramic material such as lead zirconium titanate, and various amorphous polymeric materials. The piezoelectric material is typically plated with a layer of chrome followed with a layer of gold to produce a highly conductive surface. The piezoelectric material is then sliced into a plurality of individual elements which are then reassembled, electrically isolated from one another by electrical insulation. Quartz crystals typically require relatively high voltage up to about 1,000 volts whereas crystals of lead zirconium titanate or lithium niobate require a voltage in the range of 30 to 100 volts. As an alternative to piezoelectric materials to drive the transducers, the invention also contemplates the use of mechanical and/or magnetostrictive energy sources.

The transducer array may be arranged in a linear or single row of transducer elements. The transducer array may be arranged in a two dimensional pattern. The array may be arranged in a nonplanar or a randomly placed pattern (sometimes referred to as a sparse array). The transducer array may be arranged in a concentric ring referred to as an annular array. Each arrangement of transducers has certain benefits and certain limitations. For example the linear array is simple to fabricate and uses relatively few transducer elements. However, it suffers the shortcoming of only being able to move the focal zone in 2 dimensions. The two dimensional array provides the added ability to move the focal zone in a three dimensional pattern. Obviously, it requires more elements in the array. An annular array acts along a single axis and suffers a drawback that it is only able to move the focal zone toward and away from the array with no side to side manipulation of the zone.

Generally speaking, the transducers are physically and electrically isolated from the liquid by a barrier or a wall. A bonding layer is used to attach the transducer elements to the barrier. This bonding layer may be an adhesive or a metallic bond. The layer may also serve as one of two sets of electrodes that are used to drive the transducer. All of the transducer elements are positioned between two electrodes. A voltage applied to the electrodes serves to drive the piezoelectric material to respond mechanically, and rapidly changing voltages cause acoustic waves to be emitted from the transducer elements.

The acoustic impedance of the transducer and liquid are different, causing acoustic waves to reflect from the liquid side of the wall back toward the transducer. To minimize acoustic reflection, an impedance matching layer, typically made of a material with an impedance which is between that of the transducer and the liquid, is used to increase transmission efficiency. Furthermore the layer can be designed to have a thickness equal to ¼ of an acoustic wavelength. A layer of this thickness serves to re-reflect the reflected acoustic energy back toward the liquid interface in phase with the waves emitted from the transducer.

The overall coordination and control of the transducers is performed by a phase array control computer. This computer performs the necessary calculations and data handling functions, and serves as an interface for the user of the apparatus. The control computer acquires information from the user with respect to the desired focal point and other parameters, using an input device such as a keyboard or a pointing device, for example a mouse or a tablet. Within the computer is a control program which calculates the phase relationship of each transducer element and determines the timing of the electrical signal. It converts the parameters inputted by the user and transmits these parameters to various subsystems.

The phase shifting of the signals to each element is handled by a phase shifting circuit. Each transducer element has its own channel and a separate phase shifting circuit. Means such as a digital word generator uses a pattern bit mapped into memory and outputs a digital word from a parallel port equal to the size of the array. Each bit is a channel and each channel drives one transducer element. For high frequencies that may be much higher than a control computer is capable of, a dedicated circuit with it's own memory and output ports is employed. The word generator must be capable of frequencies higher than those required by the transducer elements. If the wave length is to be accurate to $\frac{1}{32}$ of a wave, a five bit word length provides sufficient resolution. In order to construct an output, the word generator must be clocked at a frequency equal to the digital word value times the frequency of the array element. For example if a five bit resolution is needed and the element frequency is one megahertz, a clock frequency of thirty-two megahertz is used. The frequency generator provides a reference frequency that is used by the rest of the circuit. If an array of phase shifting circuits are used, the reference frequency is set to a resonant frequency of the transducer elements or perhaps a harmonic thereof. If a digitalized synthesized phase shift control is used, a transducer frequency times a given multiplier, described above, is used. A radio frequency (RF) coupler is used to provide a tap into the amplified radio frequency signal so that the signal can be monitored with minimum impact on the signal. A bi-directional coupler permits the user to monitor and compare the forward and reverse RF signal which indicates the amount of power absorbed, and thus the efficiency of the transducer. A high level of reflection indicates a mismatch in the electrical impedance. The RF coupler may also be used as a means for monitoring the signal to and from the transducer. The acoustic transducer emits acoustic waves in response to the electrical signal but conversely the transducer emits electrical signals in response to acoustic waves impinging on the transducer. The RF coupler provides a isolated tap for a monitoring device. The monitoring device can be as simple oscilloscope or a data acquisition and control system.

As previously mentioned, impedance matching circuit is used to assure that the amplifier is driving a load that has a similar electrical impedance. The circuit, which is usually an inductor and capacitor network, is designed to modify the impedance of the transducer circuit so that the impedance matches that of the amplifier.

Figure 1:
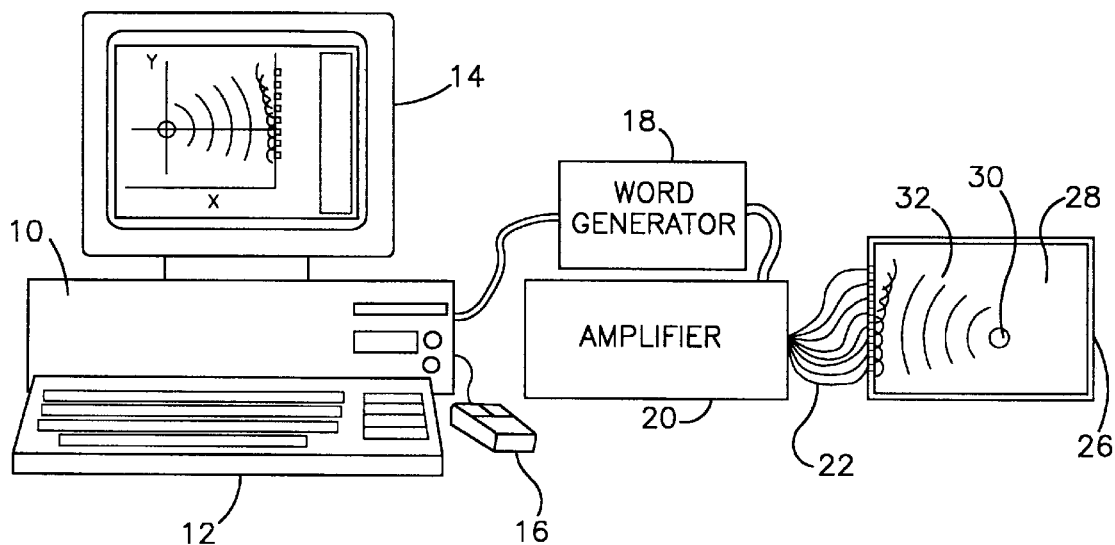
FIG. 1 is a schematic diagram of a control module for a phased array acoustic radiation pressure system.

Referring again to the drawings, FIG. 1 shows the computer set-up for operation of an experimental test cell to permit the determination of the effect of an acoustical array upon an object immersed in a liquid. The equipment consists of a computer 10 operated from a keyboard 12, mouse 16, and moniter 14, all serving as the graphical user interface. A signal from the computer goes to a word generator 18 such as a 16 bit digital generator assuming the use of a 16 channel phased array. From there a signal is transmitted to the amplifier 20, typically a 16 channel radio frequency power amplifier (for a 16 channel array). From the amplifier are a plurality of leads 22, each lead connected to one of an array of transducers, mounted on the exterior of test cell 26. The cell is filled with a suitable liquid 28. An object 30 such as a solid object is suspended in the liquid. A plurality of acoustical pulses 32 are seen focusing on the object. The pictorial is shown in monitor 14.

From the keyboard, the user establishes his settings and makes adjustments to operating perimeters. Some of these settings can include but are not limited to frequency, burst length, number and rate of repetitions, power, amplification gain, target focal zone, and signal mode selection such as pulse mode, continuous wave mode and burst mode.

A desired focal point is set by the user, which the controller then uses to calculate the wave pattern which is required. The control system sets the timing of the waves emitted from each of the transducer elements so that all waves converge on the focal point simultaneously. The program automatically calculates the time required for each wave to travel from each transducer element to the intended focal point. The waves of each element overlap at the focal point and interfere constructively so that the amplitude of each wave superimposes on the other wave to create a high acoustic intensity and radiation pressure. At high intensity, the non-linear effect of acoustic streaming becomes prevalent. When acoustic streaming occurs around the focal point it may be used to apply a hydrodynamic force against the body.

After taking into account the geometry, timing and wavelength, the control program then converts the phased array signal into a digital representation. Each wave is segmented into many small segments or time increments. The number of segments is determined by the desired word size. If a 5 bit word is adequate then each wave length is made up of 32 segments. Each transducer element uses the same pattern, except for the timing which is shifted to achieve the desired convergence, based upon the distance from the transducer to the object of the focal point. The time shift is done by shifting the channel an appropriate number of $\frac{1}{32}$ of a wave increment. Once the shift is calculated, then the number of waves used is determined and a repeating pattern is mapped and stored in the computer memory or is transferred to a circuit that acts as a buffer or temporary storage device.

To send the wave pattern to the acoustic transducer element, the pattern is transferred to an output port, increment by increment. The port has a channel for each transducer element and is connected to a corresponding amplifier channel. The port is updated at a frequency equal to the transducer element frequency times the number of increments per wave. Therefore, a 32 bit wave form requires a port to operate at 32 times the basic transducer frequency.

Each channel has a separate amplifier to convert a low voltage low power signal to a high voltage high power signal capable of driving the acoustic transducer elements. If the electrical impedance between the amplifier output and the transducer is mismatched, an impedance matching circuit may be used to increase the overall circuit efficiency.

When the signal is delivered to the transducer element, the element converts the acoustic energy emitted from the transducer. The waves from all the transducers converge on the predetermined focal point creating a high intensity effect of radiation pressure and acoustic streaming.

Referring again to FIG. 1, a plurality of transducers 24 are arranged in a linear array. The transducers are separated from the contents of the test cell by a barrier wall 34. Typically the transducers are coupled to the barrier wall using a polymeric adhesive or a metallic bond. The acoustical waves 32 generated by the individual transducers are focused on the object 30. As the timing of the acoustic wave emission is controlled by delaying or advancing individual arcs, using the computer control, the phase shifted array can synthesize a wave or wave pattern that can be steered at angles relative to the axis of the individual arrays, or be caused to diverge or converge to a predetermined focal point. As the waves converge on the object, they reinforce one another, thereby causing a concentrated pressure to be executed on the object.

FIG. 3 shows three separate pulse modes for use in the present invention including a single pulse mode shown in 3A, a tone burst mode shown in 3B and a continuous wave mode shown in 3C. In the single pulse mode, the array of transducers is capable of emitting a single pulse. This is particularly useful for acoustic sensing, to determine the position of an object within a fluid mass. The tone burst mode shown in 3B is achieved by delivering a primary signal to the transducer to emit a tone burst. The amplitude during the burst is usually fixed and the energy is controlled by controlling the length of the burst. In a digital system, the burst duration is made up of a preset number of pulses. Each burst may have a different number of pulses and thus deliver a different energy per burst. Acoustic streaming is a nonlinear effect that requires high acoustic intensities to produce an appreciable effect. These high intensities however can cause both the transducer and the liquid to become heated particularly in the high intensity region. The use of tone bursts permits the user to set up a duty cycle where the transducers are active for a given period and inactive for another period between bursts. This allows the transducers to achieve sufficient intensity to produce acoustic streaming during the active period while thermal conduction provides a chance to remove heat from the transducers during the inactive or the off period.

Figure 3A:
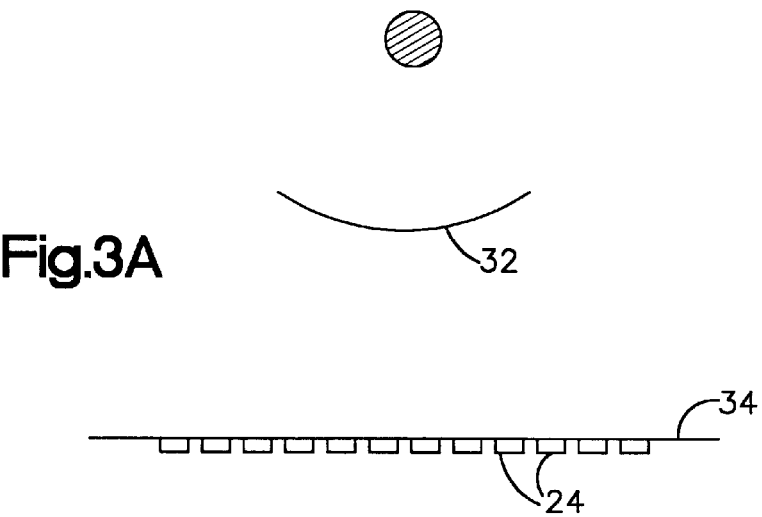
FIG. 3 depicts the various modes of generating wave formations using acoustic radiation pressure phased array.
Figure 3B:
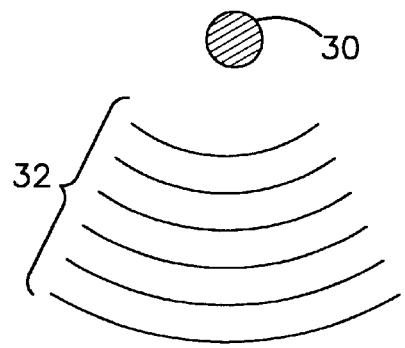
Figure 3B:
Figure 3C:
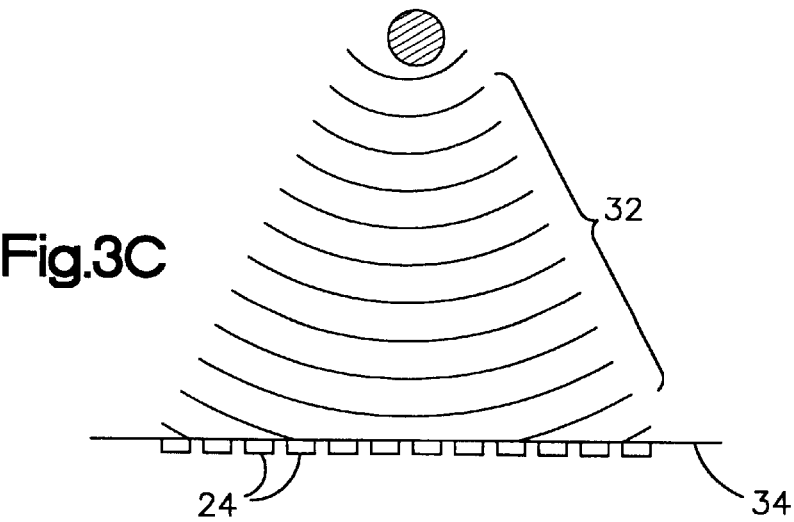

The array is also capable of a continuous wave mode where a sine wave is emitted continuously and power is controlled through amplitude modulation. A continuous wave mode is useful to deliver continuous power whenever reflections and standing waves are not a problem. This is shown in FIG. 3C.

Figure 4:
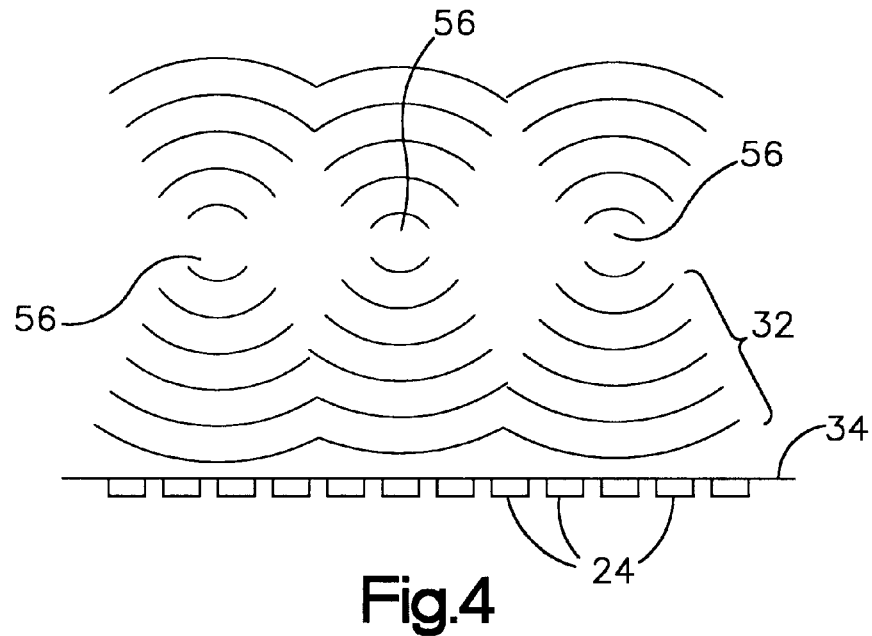
FIG. 4 represents a multiple beam array using acoustic radiation pressure phased array.

Referring now to FIG. 4, a multiple beam mode is shown. This is achieved through the clustering of several of the transducer elements to focus upon a given focal point. The array is shown as if there were three sub arrays which are focused at three separate focal points 56.

Figure 5:
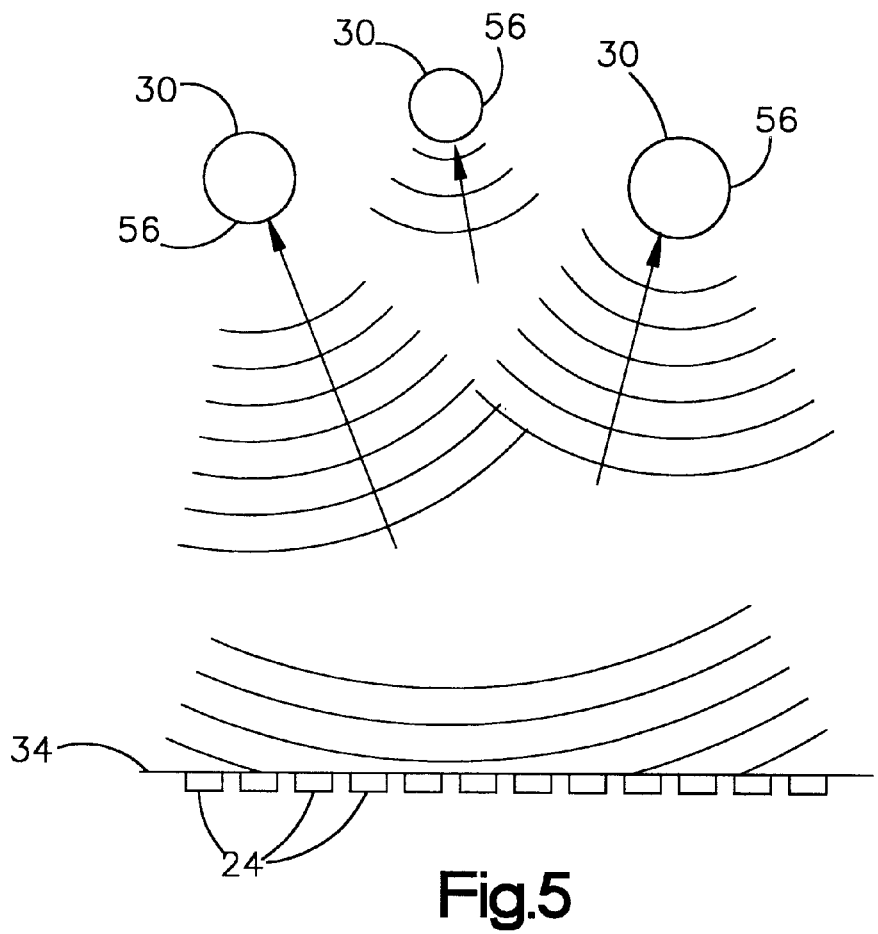
FIG. 5 shows a beam hopping mode using acoustic radiation pressure phased array.

As noted in FIG. 5, the present invention can be used to rapidly change the focused radiation between bursts to focus upon multiple objects 30. Because the system is not limited by the slow rates and positioning limitations of mechanical systems, this hopping between foci 56 can be done electronically in the order of milliseconds. When the beam is rapidly hopped between a repeating series of focal points at a high rate, then the array appears to be simultaneously focused on the multiple objects 30.

Figure 6:
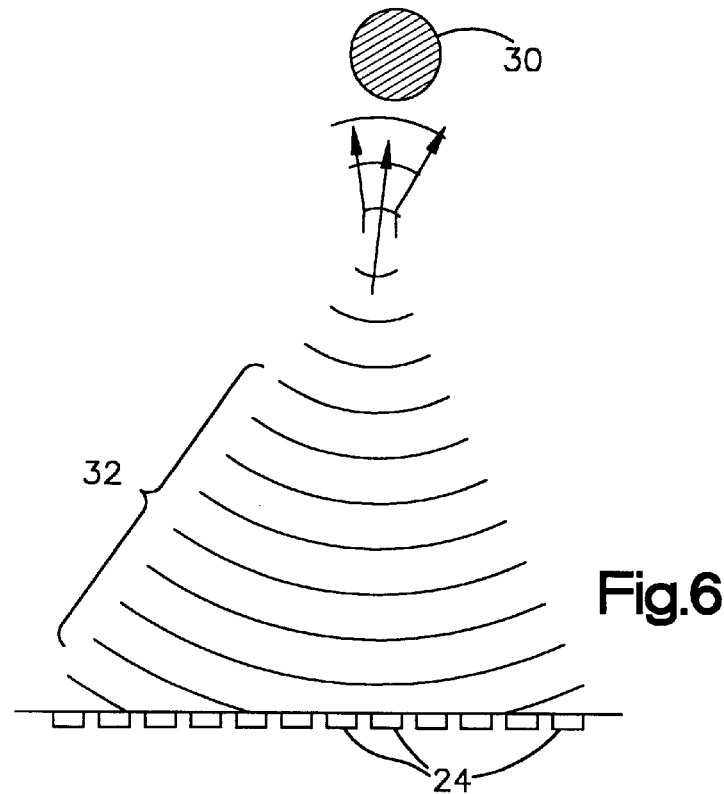
FIG. 6 portrays an indirect streaming mode using acoustic radiation pressure phased array.

In situations where it is undesirable to apply a high intensity beam directly on an object, FIG. 6 shows indirect streaming using the teachings of the present invention. In this figure, the array of transducers 24 are used to focus the beam at a distance ahead of the objects so that the beam then is deflected and becomes defocused and less intense when it impinges on the target. The acoustic streaming set up near the focal point continues past the focal point and the fluid dynamic forces and momentum of the acoustic stream acts on the object.

Figure 7:
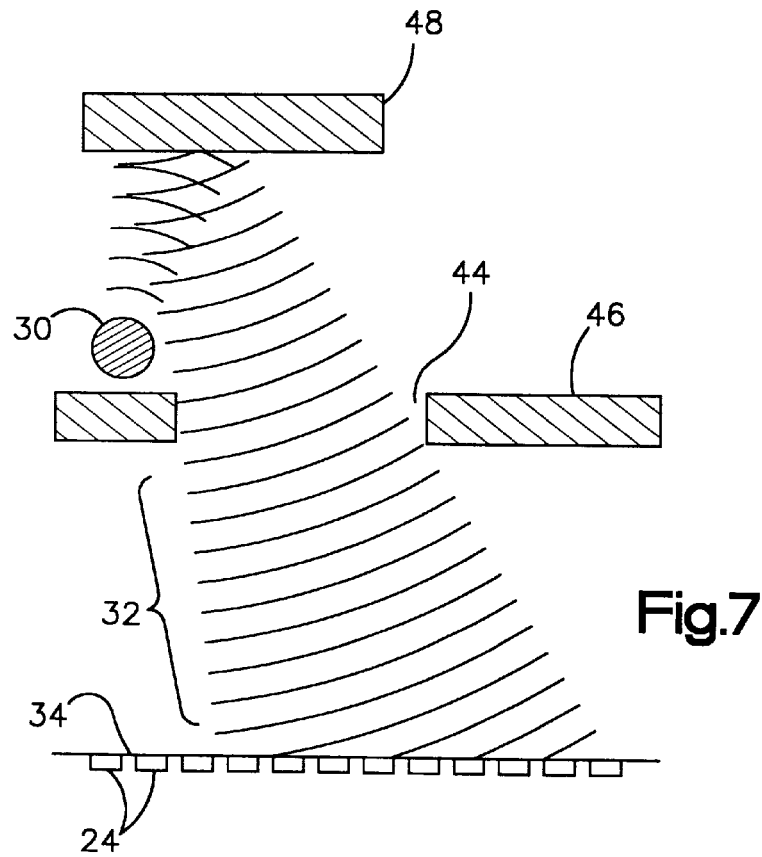
FIG. 7 shows a beam bouncing mode using acoustic radiation pressure phased array.

FIG. 7 shows the use of the present invention for bouncing the beam onto a target 30 when the target is not in the direct line of sight of the acoustical waves. This occurs for example when the object 30 is located behind a wall 46 with an aperture extending therethrough. The acoustical waves 32 emitted by the transducers 34 radiate through the aperture and bounce off an acoustically reflective surface 46 where they are retransmitted to the focal point located at the object 30.

Figure 8:
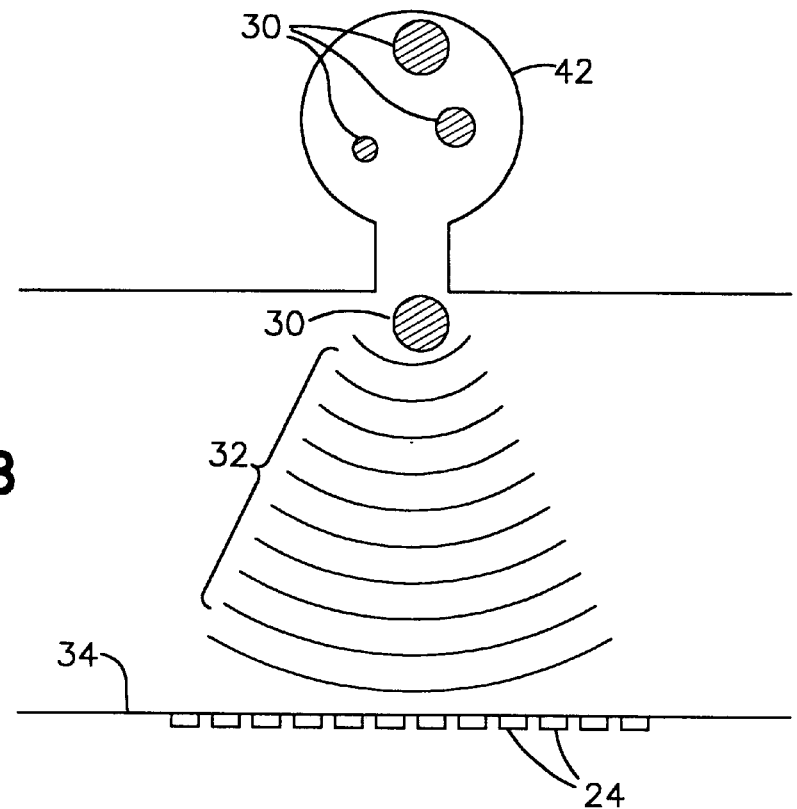
FIG. 8 depicts segregation by acoustic radiation pressure phased array.

FIG. 8 shows a technique of using an acoustic radiation pressure phased array for the segregation of solid objects or bubbles in the liquid. The liquid body is provided with an external trap 42 with an opening thereto 43 through which the objects or bubbles can pass. The acoustic array is focused on the discreet object or bubbles in the liquid, and is steered to direct these bubbles or objects to the opening through which they are passed into the trap. The trap preferably is equipped with means to permit the periodic removal of the objects or bubbles therefrom without permitting them to re enter the liquid mass. This process provides little disturbance of the liquid mass when in operation. It requires no filtering elements to clog or to require maintenance.

Figure 9:
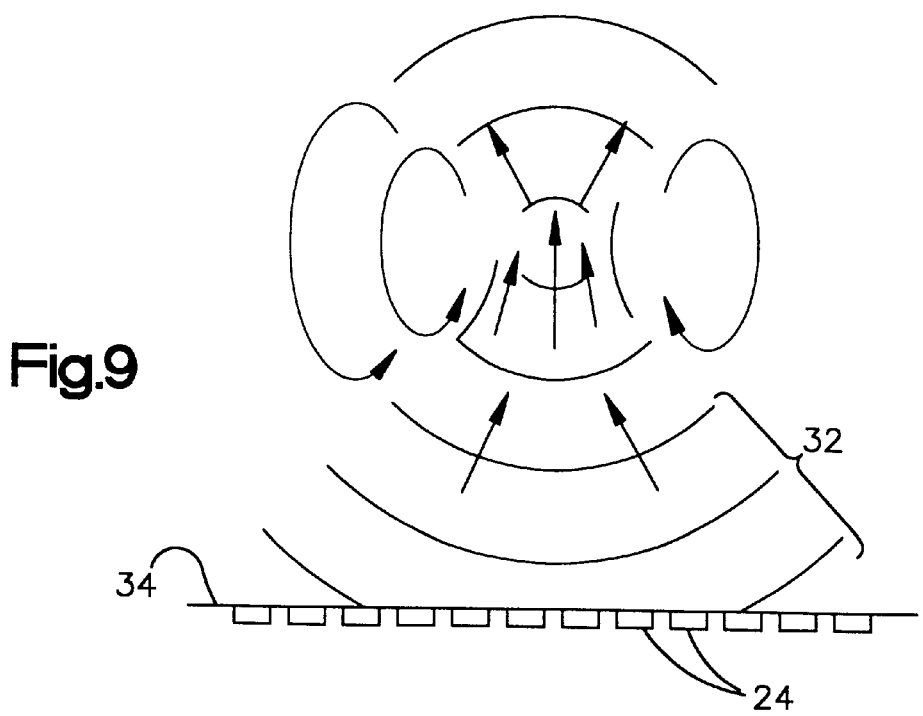
FIG. 9 shows an agitation of a liquid by an acoustic radiation pressure phased array.

FIG. 9 shows a simplified method of agitating liquids or portions of liquids. It employs a linear array of acoustic transducers 24 separated from the liquid by barrier 34. The acoustic arrays can be steered and focused by the controller to provide the advantage of mobility beyond that of mechanical means. The focus can be moved around a large volume within the liquid volume to more effectively agitate the liquid in corners or around obstructions that would otherwise be inaccessible to prior art mechanical agitation means.

The ability to transmit acoustic waves through intervening solids and liquids further improves the agitation of liquid volumes that are physically separated by one or more barriers. A further advantage is the ability to concentrate the acoustic energy at a focal point to agitate a sub-volume of liquid within the mass while minimizing the effect on the surrounding volume or the disturbance of free surfaces or nearby objects.

Figure 10:
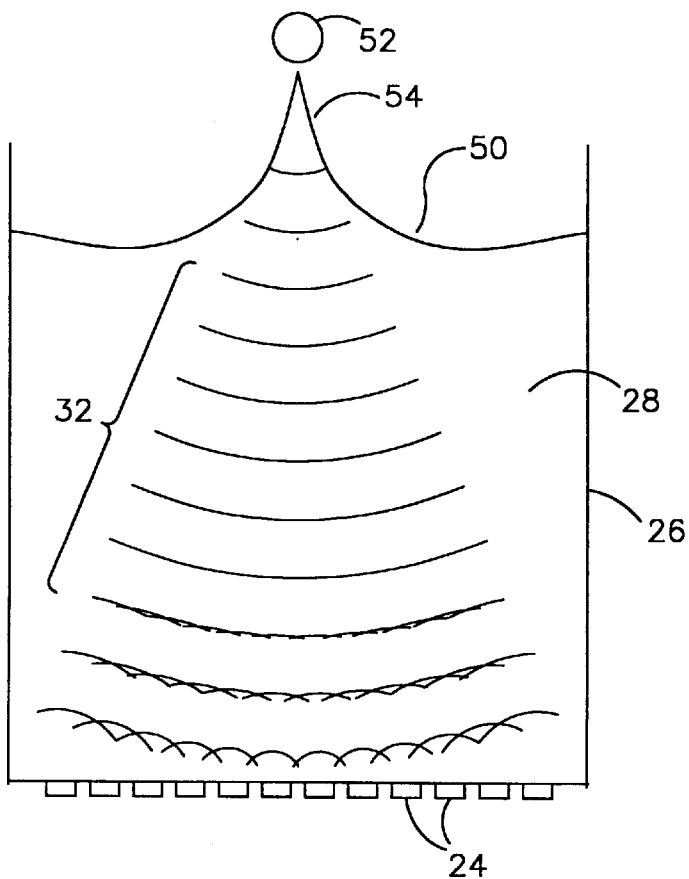
FIG. 10 shows a droplet ejected from a free liquid surface by acoustic radiation pressure phased array.
Figure 11:
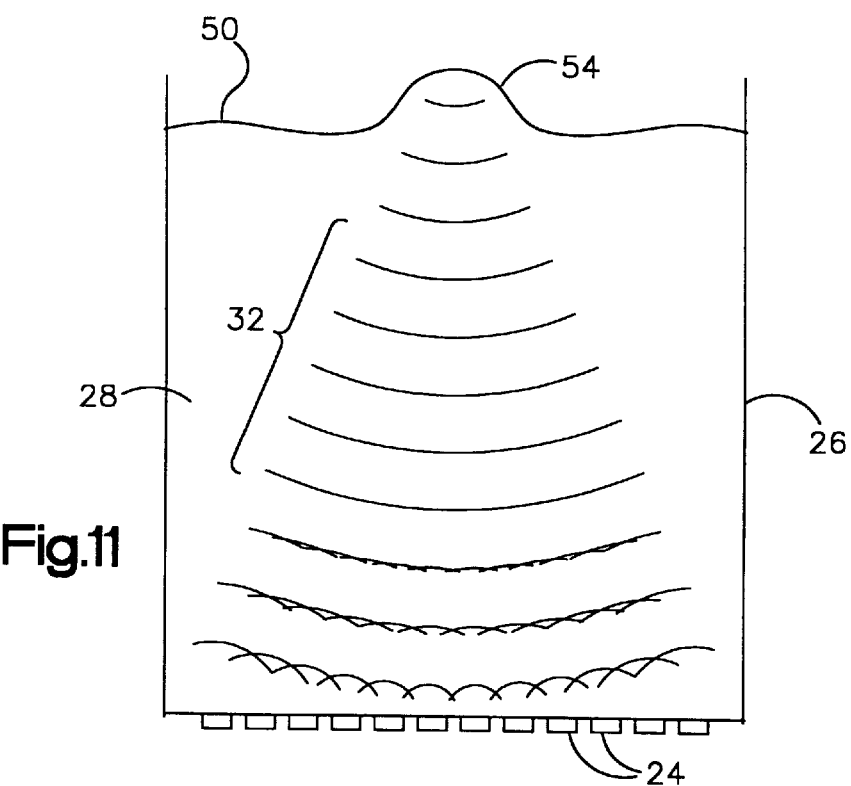
FIG. 11 shows the manipulation of a free liquid surface by acoustic radiation pressure phased array.

FIGS. 10 and 11 show the teachings of the present invention as applied to liquid surfaces. The phased array has the ability to focus high intensity acoustic waves at a liquid surface to eject droplets therefrom as shown in FIG. 10. The phased array 24 is shown directing the acoustic waves 32 at the liquid surface 50 with the focal point creating a peak 54 and a liquid droplet 52 ejected from this peak. The advantage over prior art methods is the ability to move the focus to track the free surface even when the surface is moving or is undergoing changes in level. This is possible because the transducer array can alternate between sensing and generating modes, and the array can be used to sense the surface position of the liquid surface and can be automatically adjusted to move the focal point to the surface.

Furthermore, the focus can be moved around the surface of 50 of the liquid to create a moveable ejection point. Because the phased array can be programmed to perform beam hopping between multiple locations, it may be used to form a plurality of ejection sites driven from a single array of transducers.

FIG. 11 shows another variation wherein the free surface 50 of the liquid pool 28 can be manipulated by non-contact means. No mechanical hardware is immersed in the liquids and thus even hot or chemically aggressive liquids can be worked. This invention may therefore be used for creating a stationary surface wave for wetting liquids onto objects for purposes of applying solders, coatings, or for cleaning the objects. Furthermore, the acoustical array can be used to generate a stationary surface wave that will vary in height depending upon the amplitude of the acoustic vibrations. The position of the wave can be moved and the shape can be altered upon demand. This permits the user to apply liquids to a surface selectively and thus eliminates the use of masks and their attendant operations, and the treatment of waste material.

Further because the focus size and shape can be altered at high speed, the array can also be used to apply acoustic radiation pressure to dampen surface waves and oscillations.

Figure 12:
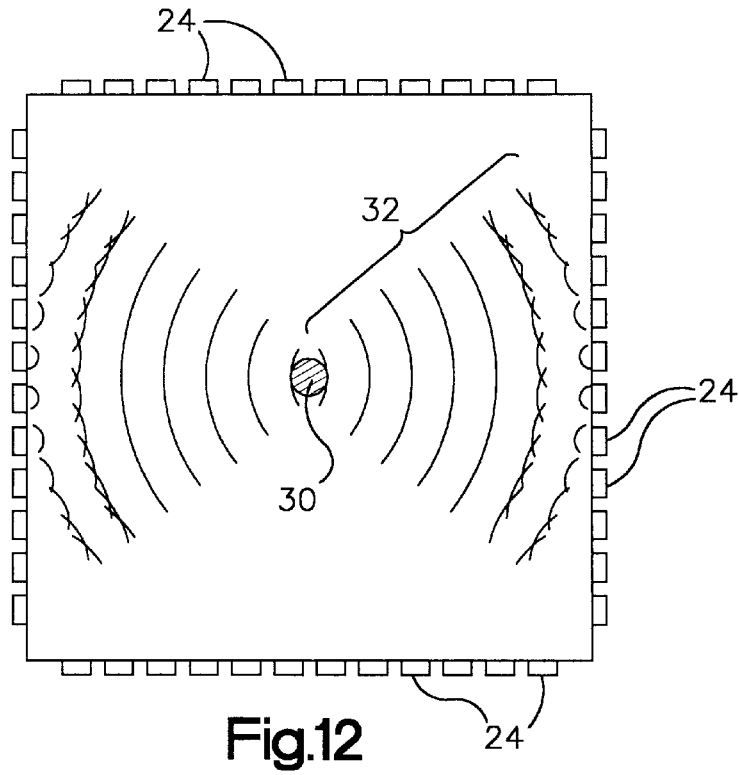
FIG. 12 shows drop or bubble deployment by acoustic radiation pressure phased array.

Referring now to FIG. 12, a plurality of transducer arrays are disposed around four sides of a liquid containment vessel. These multiple arrays can be deployed to overcome surface tension that holds a droplet or bubble on a needle or a nozzle, without the necessity of relying upon gravity, inertia, or opposing surface tension. Thus a drop or bubble can be closely controlled. This permits the deployment or dispensing of small amounts of liquid or gas in the liquid mass, a procedure which can be used to provide small doses of drugs for medical applications, or small amounts of chemicals for materials processing or manufacturing. Furthermore, the phased arrays may deploy and position droplets or bubbles, eliminating the necessity of a needle or nozzle.

Figure 13:
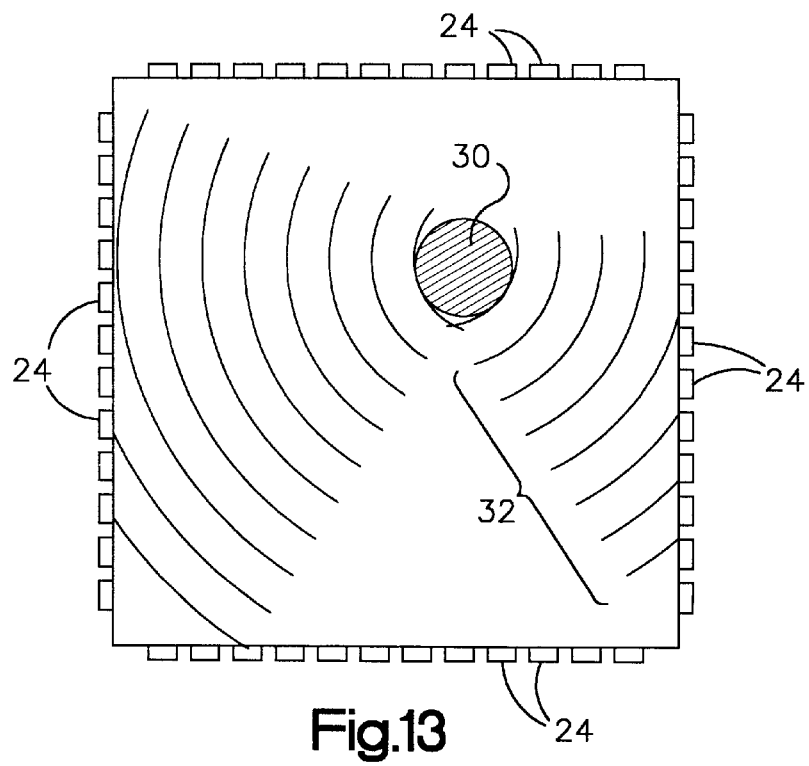
FIG. 13 shows an object manipulation by a phased acoustic radiation pressure phased array.

Referring now to FIG. 13, the use of acoustic radiation pressure phased array for the manipulation of immersed objects or bodies in a liquid is shown. The process is applicable to bubbles or drops of immiscible liquids or to partially buoyant solid objects. The ability to apply high intensity acoustics in the form of acoustic radiation pressure or acoustic streaming against an object suspended in a liquid without physically touching the object allows the user to place the object in a desired position or to create a desired motion of the object while minimizing the disturbances of the liquid media. Obviously, as previously stated, by the teachings of the present invention, a variety of objects can be acted upon in quick succession by the process of beam hopping. By using single pulses, the user can sense the characteristic of an object, measure the position and size of the object and provide the user with information about the object that is not normally visible or available to the user. Furthermore, the combination of sensing with the application of acoustic radiation pressure, allows the user to adjust for changes in shape or position or behavior of an object. Furthermore, the use of the acoustic radiation pressure to induce drop or bubble oscillation, makes this technique useful in measuring surface tension and viscosity.

Examples of the use of the present invention in space application includes the remote control agitation of liquids for space experiments or for liquid propellant tanks; the precise deployment of drops or droplets in space, for example, in physics experiments or droplet combustion experiments or for containerless processing; and the manipulation of bubbles, drops and solids suspended in liquid for physics experiments or liquid propellant control.

As previously mentioned, applications on earth involve the agitation of liquids, the segregation of suspended gas bubbles and solids in liquids; liquid drop ejection and fountaining; free surface manipulation; drop and bubble deployment; and manipulation of immersed objects.

There are many processes in earth as well as in space requiring agitation of liquids in enclosed containers, and in processing systems. The non-intrusive use of the phased array high intensity acoustic radiation pressure and/or acoustic streaming of the present invention offers advantages which mechanical systems are unable to provide. The process eliminates the need to open sealed storage containers to mechanically mix the contents. Solids can be kept in suspension, thermal gradients as well as stratification or separation of layers can be eliminated, and unneeded exposure to air or the elements is avoided.

The present invention can be used to remove or segregate bubbles or solids in sealed liquid system without the use of mechanical pumps or filters. This eliminates the need for in-line filters and their attendant problems and servicing requirements The ejection of drops from a liquid pool using the present invention eliminates problems such as clogging by suspended particles, while providing the ability to precisely control the size and velocity of the drops. The process can be used to apply coatings such as paints containing suspended solids. It can also be used for ejecting high temperature liquids such as liquid metals. Very small quantities (e.g. pico liter amounts) of liquids can be dispensed by this process.

The process finds use for anti-slosh or active wave suppression in free surface systems. It can be used for active control of wetting, or coating of solid substrates by selectively contacting the substrates with liquids.

The teachings or the present invention can be used for the purpose of deploying drops or bubbles from the discharge end of conduits such as syringe needles. This can be done on demand without relying on gravity or other external factors which normally determine when deployment occurs. Furthermore, it is possible to use the invention to deploy and position drops or bubbles while entirely eliminating the need for a needle.

The present invention is useful for the manipulation of immersed objects such as bubbles, drops of immiscible liquid and partially buoyant solid objects. It is useful for controlling the separation of liquid and gases in liquid tanks in space. It can also be used for medical procedures such as reattaching a detached retina in a human eye.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. The process of manipulating a body in a liquid mass, said body selected from the group consisting of a solid, a gas and a liquid different than the liquid mass by applying high intensity acoustic energy of several hundred watts per square cm using at least one acoustic phased array comprising a plurality of individually driven acoustical radiation transducers, the transducers in the array being commonly controlled to produce a steerable focusable beam of said acoustic energy.

2. The process according to claim 1 wherein the high intensity acoustics is used to propel a body through the liquid mass.

3. The process according to claim 1 wherein the high intensity acoustics are used to remove the body from the liquid mass.

4. The process according to claim 1 wherein the high intensity acoustics are used to segregate the body from the liquid mass.

5. The process according to claim 1 wherein the high intensity acoustics are applied to the liquid mass by a continuous wave.

6. The process according to claim 1 wherein the high intensity acoustics are applied to the contents of the liquid mass by tone burst modulation.

7. The process according to claim 1 wherein the high intensity acoustics are applied to the liquid mass at multiple points in rapid succession.

8. The process according to claim 1 wherein an acoustic phased array is used to focus acoustic radiation pressure against an acoustically reflective surface, to redirect the wave pressure on a target mass.

9. An apparatus for manipulating a body in a liquid mass comprising a plurality of acoustic radiation transducers in a phased array, control means for activating individual transducers in the phased array, said control means including an electrical connection between each transducer in the pattern, and an electrical signal, said electrical signal originating in a signal generator circuit, said signal generator circuit including a radio frequency power amplifier circuit, means for focusing the transducers on a target, and a boundary physically separating, and acoustically coupling the transducers and the liquid mass.

10. The apparatus according to claim 9 wherein the radio frequency power amplifier circuit includes an impedance matching network.

11. The apparatus according to claim 9 wherein the individual acoustical transducers are arranged in an array selected from the group consisting of linear single dimension, linear multi-dimensional, a sparse array, a curved array and an annular array of concentric rings.

12. The process of controlling the spatial relationship between a plurality of bodies in a liquid mass said bodies selected from the group consisting of a solid, a gas and a liquid different than the liquid mass by applying acoustical radiation pressure using at least one acoustic phased array comprising a plurality of individually driven acoustical radiation transducers, the transducers in the array being commonly controlled.

13. An apparatus for manipulating a body in a liquid mass comprising a plurality of acoustic radiation transducers in a phased array, control means for activating individual transducers in the phased pattern, the control means includes an electrical connection between each transducer in the pattern, and an electrical signal originating in a signal generator circuit which comprises a radio frequency power amplifier circuit including an impedance matching network, means for focusing the transducers on a target, a boundary physically separating and acoustically coupling the transducers and the liquid mass, and acoustic feedback signal for acoustical sensing.

* * * * *